Patented Oct. 10, 1944

2,360,081

UNITED STATES PATENT OFFICE 2,360,081

ZEIN DISPERSIONS

Charles Waldo Stewart, River Forest, Ill., assignor to Corn Products Refining Company, New York, N. Y., a corporation of New Jersey No Drawing. Application August 1, 1940, Serial No. 349,288

1 Claim. (Cl. 106—153)

This invention relates to zein dispersions, processes for preparing and using the same; and the primary object of the invention is to provide means whereby zein dissolved in any of its common solvents, for example, in aqueous ethyl, methyl or isopropyl alcohol, or in the higher boiling point organic solvents, may be dispersed in relatively large quantities of water to form stable dispersions, that is to say, dispersions in which the proportion of water to alcohol is in excess of, and may be very much in excess of, that which in the ordinary mixtures of zein solutions with water would bring about precipitation of the zein.

This result is obtained by incorporating in the alcoholic or other solution of zein a water soluble, highly ionized dispersing agent, containing in addition to hydrophilic groups of atoms (implied by water solubility and ionization) hydrophobic groups which attach themselves to the dissolved zein, either by loose chemical combination therewith or by surface attraction, whereby the stable dispersion of the zein solution with large quantities of water is made possible.

By the term "stable dispersion" is intended a condition wherein the zein is in a dissolved, or in a colloidal, or in such a highly dispersed or distributed state in the medium, consisting of the zein solvent and the water, that no substantial precipitation of zein will take place where the dispersion is allowed to stand for long periods of time. The dispersions contemplated by the invention are, therefore, to all intents and purposes, permanently stable, provided, that is, that no denaturation of the zein takes place. The degree of dispersion and of stability and the physical characteristics of such dispersions may, however, vary to some extent according to the particular dispersing agents used. In most cases the dispersions are clear solutions, even at relatively high dilutions, and will pass through filter paper. In some cases, however, the dispersions are of a gelatinous nature.

This invention, therefore, relates to the treatment of zein solutions whereby they are made capable of tolerating large quantities of water without precipitation; that is to say, to water dispersions of zein in which the zein has first been dissolved in alcohol or other zein solvent so as to form a flowable solution. It has also been discovered that the dispersing agents of the general class employed by the present invention may be used for the dispersion of zein in water alone, that is, the dispersion in water of zein in its natural state, without being first dissolved in alcohol or other zein solvent. This invention, however, is not claimed herein as it is the discovery of, and is covered in the application of, Albert Luther James, Serial No. 351,274, filed August 3, 1940. Nor are water dispersions of zein containing alcohol or other zein solvents in amount insufficient to dissolve the zein and form a flowable solution therewith, claimed herein, such dispersions being claimed in the aforesaid James application; the present application being limited to zein-alcohol-water dispersions in which alcohol or other zein solvent is present in quantities sufficient to completely dissolve the zein.

The products of the present invention may be used, among other purposes, for the production of films; for the coating or impregnating of paper, cardboard, textile fabrics, and the like; for the production of laminated articles; as vehicles for pigments and dyes; for the production of plastics; and for the manufacture of filaments. The use for these, and other similar purposes, of zein dispersions containing large quantities of water and smaller quantities of organic solvents, has the obvious advantage of cheapness over the zein solutions in which the solvent medium is, or consists principally of, alcohol or one or more of the other usual organic solvents of zein.

The composition of matter of the present invention has the further advantage of being less penetrating than the usual zein-alcohol solution, when applied to more or less porous paper, for example kraft paper, so that a smaller quantity of it need be used to obtain the same coating effect. This feature is of particular value when the compound is used as a vehicle for pigments or dyes, as it involves the saving not only of the vehicle but also of the pigment or dye.

Zein is capable of being dissolved or dispersed in 95% ethyl alcohol (it is not soluble in anhydrous ethyl alcohol); but if the water content of the alcohol is increased above a certain proportion, about 40% water by volume, the exact amount depending on the temperature of the solution, the character of the zein and other conditions such as pH variations, the zein will be precipitated. The presence of an excess of water brings about the precipitation of zein from any of the zein solvents; the water content necessary to cause precipitation varying with the particular solvent. In fact, this precipitating effect of water, when introduced into zein-alcohol solution, is utilized in the process of extracting zein from corn (maize) gluten with alcohol, as a means for separation of the zein from the extract; such separation being ordinarily effected by adding large quantities of water to the extract, that is, to the zein-alcohol solution.

Examples of dispersing agents suitable for the purposes of this invention include the following water soluble, highly ionized compounds containing eight or more carbon atoms; (1) the alkali metal, ammonia and amine soaps; (2) the sulfonated vegetable oils; (3) the sulphated and sulfonated fatty acids and the alkali metal, ammonia and amine and other water soluble salts of said sulphated and sulfonated fatty acids; (4) the sulphated and sulfonated fatty alcohols and the alkali metal, ammonia, amine and other water soluble salts of said sulphated and sulfonated fatty alcohols; (5) the alkali metal, ammonia, amine and other water soluble salts of alkyl, aryl, alkyl aryl, and heterocyclic sulphonic acids; (6) the salts of aryl carboxylic acid; and (7) derivatives of any of these groups which contain at least eight carbon atoms in the organic radical and substituent group taken together.

These dispersing agents contain, in addition to a hydrophilic group, implied by water solubility and a high degree of ionization, a hydrophobic group which attaches itself to the zein either by loose chemical combination (as occurs in the hydration of a salt), or by surface action, and thereby, apparently, effects the dispersion of the dissolved zein in water in quantities far in excess of those which would be tolerated without precipitation, by the ordinary zein solution. The hydrophobic group comprises a hydrocarbon group within the broad organic groups known as aliphatic (octyl and decyl); aromatic (benzyl and naphthyl); hydro-aromatic (cyclopentyl); and heterocyclic (furfuryl and pyridyl). Such compounds will not usually be effective for the purposes of the present invention unless the carbon chain contains eight or more carbon atoms including, where there is substitution, the carbon atoms of both the radical and the substituent groups.

The dispersing agent is highly ionized, in distinction to the ordinary zein solvents, such as the alcohols, which are either not ionized at all or are very slightly ionized. In referring to the zein solvents herein, by that term, the intention is to designate the common organic solvents of zein which, as stated, are either not ionized at all or are very slightly ionized, and not to include in this term the dispersing agents of this invention which, however, in a sense at least, have a solvent effect on the zein.

The dispersing agents are non-reactive with the zein in solution in the sense of not forming permanent compounds therewith or modifications thereof.

All of the substances of the beforementioned groups of substances may be used for the purposes of the present invention, some with greater and some with less effect, and with, it may be said, variations in the characteristics of the resultant products.

Specific examples of group (1) are the alkali metal soaps, viz: potassium stearate, sodium stearate (which gives a dispersion of gelatinous character), and the potassium and sodium salts of the following organic acids: palmitic, myristic, lauric, capric, caprylic, oleic, linoleic, linolinic, ricinoleic, and combinations of these such as are present in the natural oils, for example, the fatty acids of linseed oil, corn (maize) oils, cottonseed oil and castor oil, the natural resin acids such as abietic acids, and the highly acid resins such as shellac and Manila gum.

Also the ammonia soaps, for example: the ammonia soap of linseed oil fatty acids, the ammonia soap of naphthenic acid, the ammonia salt of tall oil, and, in fact the ammonia soap of any of the acids or acidic materials referred to above in connection with the alkali metal soaps.

Also the amine soaps, for example: the soap of lauric acid and triethanolamine, the soap of lauric acid and mono-methylamine, the morpholine soap of rosin, and the soaps of any of the acids, referred to above (in connection with the alkali soaps) with any of the aliphatic amines including the mono-, di- and tri-methyl, ethyl, butyl, propyl and amyl amine, morpholine, pyridine, and mono-, di- and tri-ethanolamines.

Specific examples of group (2) are: sulfonated castor, corn (maize), soyabean and linseed oil. It will be understood that these sulfonated oils are the water soluble products of commerce obtained by neutralizing the reaction products of the oils and the sulfonating agents with an alkaline material.

Specific examples of group (3) are: The alkali metal, ammonia, amine and other water soluble salts of sulfonated and sulphated ricinoleic acid, oleic acid, linoleic acid, and of the fatty acids derived from castor, linseed, soyabean, cottonseed, corn and any other vegetable oil.

Specific examples of group (4) are: Sodium lauryl sulphate, and sodium, potassium, ammonium and amine salts of sulfonated and sulphated octyl, lauryl, myristyl, palmityl, and stearyl alcohols.

Specific examples of group (5) are: Isopropyl naphthalene sulfonic acid and its isomers.

A specific example of group (6) is the sodium salt of monobutyl phthalate.

A specific example of group (7) is: Igepon A. P. (sodium salt of oleyl ethane sulfonic acid).

With the majority of dispersing agents, as given above, the most useful dispersions will be obtained if the pH is maintained relatively close to the neutral point. However in certain cases where the acidic radical of the dispersing agent is highly ionized and water soluble, it will be possible to make satisfactory dispersions, for some purposes at least, which have pH's that are relatively low. With sulphonated oils it is possible to obtain stable dispersions having pH's as low as 5.5, although such dispersions are not ordinarily practical or desirable as coating materials. These low pH dispersions are particularly sensitive to salting out in the presence of relatively small amounts of inorganic salts. In the case of certain sulphonic acids, or sulphuric acid derivatives, it is possible to produce satisfactory dispersions having a pH as low as 1.5. See Example 12 below.

In the preparation of these alcohol and water dispersions of zein, it is necessary to avoid the presence of appreciable amounts of salting out agents; that is, the use of any electrolyte such as sodium chloride, sodium sulphate, sodium carbonate, or excess of alkali such as sodium hydroxide, which will have the effect of salting out the zein-dispersing agent combination from the dispersion formed by the addition of water and the dispersing agent to the zein solution. The sensitivity of these dispersions to the salting out effect will be dependent upon the nature of the dispersing agent, the pH of the solution, and the proportions of the various materials in the dispersion.

The relationship between the amounts of zein and dispersing agent in these mixtures will be dependent upon the nature of the dispersing agent and on the degree to which it is desired to dilute the resulting mixture. In general, and for practical applications, the amount of dispersing agent will vary from between 40% and 100% by weight, based on the weight of the zein. These, however, are not to be regarded as critical limits. The use of lesser amounts of dispersing agents will in some cases be effective, while the use of larger amounts, unnecessary to keep the zein in the dispersed condition in the alcohol-water medium, may be desirable for certain specific applications.

The term "solvent of zein" is intended to include the low boiling point alcohols such as ethyl, methyl and isopropyl alcohol; also the higher boiling point alcohols such as butyl, hexyl, amyl alcohols; and also the other common solvents of zein such as Cellosolve (ethylene glycol monoethyl ether) and Carbitol (diethylene glycol monoethyl ether) which are not ionized, or are very slightly ionized; and is intended to exclude the substances herein described as dispersing agents which are characterized by a high degree of ionization.

By using a dispersing agent such as an ammonia soap having a volatile component (ammonia) and an acidic component, the dispersing agent may be dissociated, after the zein body has been formed by decomposition or otherwise, and the volatile component driven off so as to release the acidic component in an insoluble state, which increases water resistance and flexibility of the zein body. A similar result may be obtained by using a precipitating agent to dissociate the dispersing agent and bring about the insolubilizing of its acidic component.

The dispersions may be produced in concentrated form, that is, with a relatively low water content, in order to reduce the cost of packaging and shipment, and the material diluted with water to any desired extent before using.

The following are specific examples of the application of the invention to practice. It will be understood that the operating data given in these examples are purely informative and typical and are not to be regarded as limitations upon the invention; the intention being to cover all equivalents and all workable variations in proportions, as well as all other modifications within the scope of the appended claim. In the examples the proportions are given by weight, except as indicated. Variations in proportions are given, in some instances, by figures in parentheses, which, however, are not critical proportions but merely practical working ranges.

*Example 1*

(a) Zein, 80 parts, is dissolved in 80 parts of ethyl alcohol and 50 parts of water to form a flowable solution.

(b) Rosin, 30 parts, is dissolved in 46 parts of ethyl alcohol of 95% concentration (by volume) to which is added 10 parts of a 50% caustic soda solution. The resulting compound is an alcohol solution of rosin soap.

(c) The rosin soap solution (b) is mixed with the zein solution (a). The resulting compound is a zein dispersion to which water may be added, either immediately or when the solution is to be used, in the proportion of 9 parts of water to 1 part of the dispersion (c).

In place of caustic soda one may use any alkaline material which when reacted with the rosin, or its equivalent, will yield a readily water soluble soap.

In place of rosin one may use any of the natural resins or hydrogenated rosin (included in the term "natural resin," since it is a derivative thereof) which, on neutralization will yield a readily soluble salt.

In place of the alcohol one may use any of the common zein solvents as stated above.

The proportions given in this example are the preferred proportions but they may be very considerably varied.

When mixed with the relatively large volumes of water indicated, a zein dispersion is provided from which there will be substantially no precipitation of zein on standing, say, for twenty-four hours or more. The zein-alcohol-water dispersion thus produced may be converted into a film or other solid body by evaporation of the alcohol and water in any usual and suitable manner. For example, the dispersion may be spread on a surface to be coated and the film dried in heating or allowed to dry by natural evaporation.

*Example 2*

(a) 15 parts of zein is dissolved in 15 parts of 95% ethyl alcohol to form a flowable solution.

(b) To this is added 5 parts of lauric acid and 5 parts of triethanolamine. The mixture is preferably warmed until a clear solution is produced. The reaction of the lauric acid and triethanolamine results in an amine laurate soap, the presence of which in the zein alcohol solution makes it miscible with large amounts of water without precipitation of zein.

The quantities of lauric acid and triethanolamine may each vary from 5 to 15 parts.

*Example 3*

(a) 15 parts of zein is dissolved in 10-15 parts of Cellosolve (diethylene glycol monoethyl ether) forming a flowable solution.

(b) To solution (a) is added 3 parts (3-9) of monomethylamine and 5 parts (5-15) of lauric acid. Any substantial quantity of water will precipitate zein from a Cellosolve solution; but the zein solution containing the dispersing agent in accordance with this example will be found to be miscible with water in all proportions, within practical limits, without precipitation of the zein.

*Example 4*

The following compound gives a tough, flexible and grease resistant coating when solidified by evaporation.

|  | Parts |  |
|---|---|---|
| Zein | 15 | |
| Butyl or ethyl alcohol | 20 | |
| Tall oil | 10 | (10-15) |
| Ammonium hydroxide | 1 | (1-2) |
| Urea | 5 | (5-15) |
| Glycerine | 3 | (2-6) |
| Water | 50 | |

The zein is first dissolved in the butyl alcohol and enough water to effect the solution, for example, 5 parts. The other ingredients with the rest of the water are added to the zein solution.

*Example 5*

To a solution of 10 parts of zein in 30 parts of 85% (volume) isopropyl alcohol is added 6 parts of ammonia rosin size which is a commercially available ammonium soap of rosin. The resulting solution can be diluted with water as may be desired.

Example 6

To a solution of 10 parts of zein and a mixture of 10 parts of methanol and 10 parts of 95% (volume) ethyl alcohol is added 5 parts of the ammonia soap of linseed oil fatty acids. The resulting mixture can be diluted with water and used for coating or impregnating. If the resulting film is heated, the ammonia will be driven off and a flexible and water resistant film consisting of zein and fatty acids will remain. By using a dispersing agent containing an acidic (fatty acid) and a volatile alkaline component (ammonia) the driving off of the volatile component releases the acidic component, in an insoluble state and this component acts as a plasticizer and as an agent for giving the film or other body water resistance.

Example 7

To a solution of 10 parts of zein in 20 parts of 70% (volume) ethyl alcohol is added 4 parts of rosin and 1 part of morpholine. If desired, 2 parts of urea and one part of glycerine may be added as plasticizers. The resulting composition may be diluted with water for application as a coating or impregnating material.

Example 8

To a solution of 10 parts of zein in 20 parts of 70% (volume) isopropyl alcohol is added 4 parts of the ammonia soap of naphthenic acid, derived from petroleum. The resulting solution may be diluted with large amounts of water and will yield remarkably clear solutions at all concentrations.

Example 9

To a solution of 10 parts of zein in 20 parts of 90% (volume) methanol is added 10 parts of sodium stearate. When this mixture is diluted with water, a dispersion is formed which is liquid when hot but which tends to set to a viscous gel-like structure when cooled, the exact character and degree of gellation depending upon the amount of water and temperature. This dispersion may be used as a paste or for other purposes where a rather heavy body with a low concentration of solids is desired.

Example 10

A solution of 10 parts of zein in 20 parts of 90% (volume) ethyl alcohol is poured into a solution of 10 parts of Avitex S. F. (a sulfated stearyl alcohol) and 100 parts of water. A smooth paste is formed which may be diluted with large volumes of water.

Example 11

A solution of 10 parts of zein in 30 parts of 60% (volume) isopropyl alcohol is stirred into a solution of 20 parts of Nekal B. X. (sodium salt of alkyl naphthalene sulphonic acid) in 200 parts of water. A homogeneous and stable dispersion is formed.

Example 12

A solution of 10 parts of zein in 20 parts of methanol is added to a solution consisting of 100 parts of water and an oleyl ethane sulfonic acid salt derived, by extraction with alcohol, from 10 parts of Igepon A. P., a commercial product containing also inorganic salts which it is the purpose of the extracting operation to eliminate. Where Igepon A. P. is used without this removal of inorganic salts, the zein does not disperse but remains as a dough. By using the extract of oleyl ethane sulfonic acid salt derived from the commercial product, a clear dispersion of the zein is obtained.

In this case it is possible to acidify the dispersion to a pH of 1.5 without bringing about the precipitation of the zein.

I claim:

A composition of matter comprising the following substances in proportions by weight approximately as follows: zein 10 parts; 90 per cent (volume) ethyl alcohol 20 parts; a sulphated stearyl alcohol 10 parts; and water 100 parts.

CHARLES WALDO STEWART.